United States Patent
Sanderovich et al.

(10) Patent No.: US 10,498,418 B2
(45) Date of Patent: Dec. 3, 2019

(54) FRAGMENTED BEAMFORMING FOR WIRELESS DEVICES

(71) Applicant: QUALCOMM Incorporated, San Diego, CA (US)

(72) Inventors: Amichai Sanderovich, Atlit (IL); Assaf Yaakov Kasher, Haifa (IL); Solomon Trainin, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/867,217

(22) Filed: Jan. 10, 2018

(65) Prior Publication Data

US 2018/0198506 A1    Jul. 12, 2018

Related U.S. Application Data

(60) Provisional application No. 62/445,230, filed on Jan. 11, 2017.

(51) Int. Cl.
| | |
|---|---|
| *H04B 7/06* | (2006.01) |
| *H04W 84/12* | (2009.01) |
| *H04B 7/0413* | (2017.01) |

(52) U.S. Cl.
CPC ........... *H04B 7/0617* (2013.01); *H04B 7/063* (2013.01); *H04B 7/0695* (2013.01); *H04B 7/0413* (2013.01); *H04W 84/12* (2013.01)

(58) Field of Classification Search
CPC .... H04B 7/0617; H04B 7/0695; H04B 7/063; H04B 7/0413; H04W 84/12
See application file for complete search history.

(56) References Cited

U.S. PATENT DOCUMENTS

| | | | |
|---|---|---|---|
| 2010/0214169 A1* | 8/2010 | Kafle | H01Q 3/26 342/368 |
| 2011/0069688 A1* | 3/2011 | Zhang | H04L 1/0083 370/338 |

(Continued)

FOREIGN PATENT DOCUMENTS

| | | |
|---|---|---|
| WO | 2014074894 A1 | 5/2014 |
| WO | 2016175949 A2 | 11/2016 |

OTHER PUBLICATIONS

International Search Report and Written Opinion—PCT/US2018/013275—ISA/EPO—dated Apr. 17, 2018.

*Primary Examiner* — Dac V Ha
(74) *Attorney, Agent, or Firm* — Steven R. Thiel; Patterson & Sheridan LLP

(57) ABSTRACT

Certain aspects of the present disclosure provide methods and apparatus for a fragmented beamforming training procedure. For example, an apparatus for wireless communications may include a processing system configured to generate a plurality of first frames, each first frame comprising a preamble, a data field, and one or more beamforming training fields. The apparatus may also include a first interface configured to output the plurality of first frames for transmission using a first transmit beamforming sector for the preamble and data field of each the plurality of first frames and a different second transmit beamforming sector for each of the one or more beamforming training fields of the plurality of first frames, and a second interface configured to obtain a second frame comprising feedback generated based on the one or more beamforming training fields of the plurality of first frames.

24 Claims, 7 Drawing Sheets

(56) References Cited

U.S. PATENT DOCUMENTS

| | | | |
|---|---|---|---|
| 2015/0289147 A1* | 10/2015 | Lou | H04B 7/0408 |
| | | | 370/329 |
| 2017/0317727 A1* | 11/2017 | Wang | H04B 7/0626 |
| 2017/0352954 A1* | 12/2017 | Abdallah | H01Q 3/34 |
| 2018/0069669 A1* | 3/2018 | Park | H04B 7/0695 |

* cited by examiner

FRAGMENTED BEAMFORMING FOR WIRELESS DEVICES

CLAIM OF PRIORITY UNDER 35 U.S.C. § 119

The present Application for patent claims benefit of U.S. Provisional Patent Application Ser. No. 62/445,230, filed Jan. 11, 2017, assigned to the assignee hereof and hereby expressly incorporated by reference herein.

FIELD OF THE DISCLOSURE

Certain aspects of the present disclosure generally relate to wireless communications and, more particularly, to utilizing fragmenting beamforming training.

DESCRIPTION OF RELATED ART

In order to address the issue of increasing bandwidth requirements demanded for wireless communications systems, different schemes are being developed to allow multiple user terminals to communicate with a single access point by sharing the channel resources while achieving high data throughputs. Multiple-input multiple-output (MIMO) technology represents one such approach that has recently emerged as a popular technique for next generation communication systems. MIMO technology has been adopted in several emerging wireless communications standards, such as the Institute of Electrical and Electronics Engineers (IEEE) 802.11 standard. The IEEE 802.11 standard denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide an apparatus for wireless communications. The apparatus generally includes a processing system configured to generate a plurality of first frames, each first frame comprising a preamble, a data field, and one or more beamforming training fields, a first interface configured to output the plurality of first frames for transmission using a first transmit beamforming sector for the preamble and data field of each the plurality of first frames and a different second transmit beamforming sector for each of the one or more beamforming training fields of the plurality of first frames, and a second interface configured to obtain a second frame comprising feedback generated based on the one or more beamforming training fields of the plurality of first frames.

Certain aspects of the present disclosure provide an apparatus for wireless communications. The apparatus generally includes a first interface configured to obtain a plurality of first frames, each first frame comprising a preamble, a data field, and one or more beamforming training fields, wherein a same first transmit beamforming sector is used for transmitting the preamble and data field of each first frame and a different second transmit beamforming sector is used for each of the one or more beamforming training fields, a processing system configured to generate feedback based on the one or more beamforming training fields in the plurality of first frames and generate a second frame with the feedback, and a second interface configured to output the second frame for transmission.

Certain aspects of the present disclosure provide an apparatus for wireless communications. The apparatus generally includes a first interface configured to obtain a plurality of first frames, each first frame comprising a preamble, a data field, and one or more beamforming training fields, wherein a same transmit beamforming sector is used for transmitting the one or more beamforming training fields of the plurality of first frames, and a processing system configured to evaluate different receive beamforming sectors based on the one or more beamforming training fields in the plurality of first frames, and update antenna settings based on the evaluation.

Certain aspects of the present disclosure provide an apparatus for wireless communications. The apparatus generally includes a processing system configured to generate a plurality of first frames, each first frame comprising a preamble, a data field, and one or more beamforming training fields, and a first interface configured to output the plurality of first frames for transmission using a same transmit beamforming sector for each of the one or more beamforming training fields.

Aspects of the present disclosure generally include methods, apparatus, systems, computer readable mediums, and processing systems, as substantially described herein with reference to and as illustrated by the accompanying drawings. Numerous other aspects are provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 1 is a diagram of an example wireless communications network, in accordance with certain aspects of the present disclosure.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Figure 1:
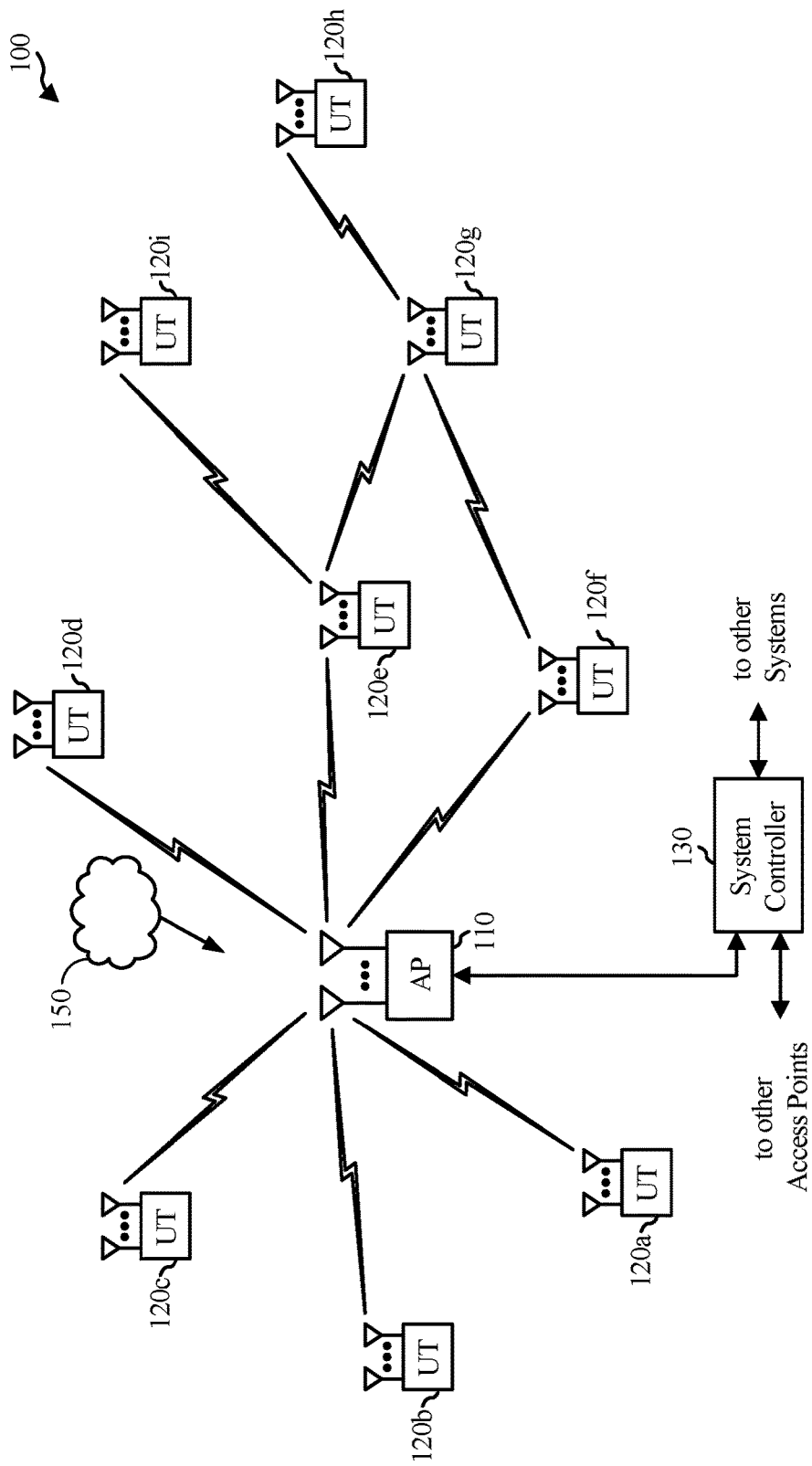

Certain aspects of the present disclosure provide methods and apparatus for performing fragmented beamforming training that may help reduce latency associated with beamforming training.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure described herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. The techniques described herein may be utilized in any type of applied to Single Carrier (SC) and SC-MIMO systems.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an access point (AP) 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, $N_{ap} \geq K \geq 1$ may be provided if the data symbol streams for the K user terminals are not multiplexed in code, frequency, or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals may have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
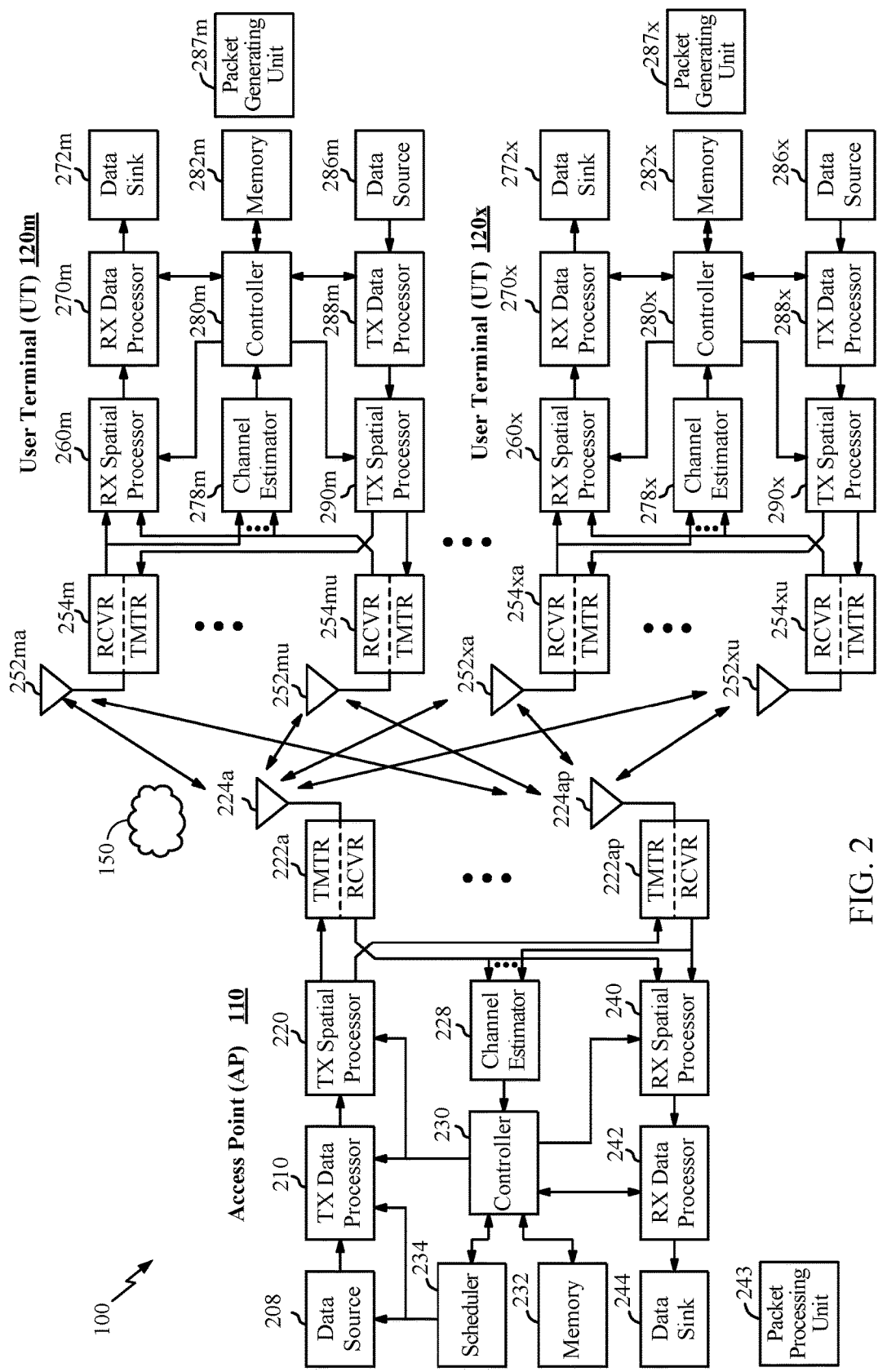
FIG. 2 is a block diagram of an example access point and example user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, Nup user terminals are selected for simultaneous transmission on the uplink, Ndn user terminals are selected for simultaneous transmission on the downlink, Nup may or may not be equal to Ndn, and Nup and Ndn may be static values or can change for each scheduling interval. The beam-steering or some other spatial processing technique may be used at the access point and user terminal. The access point 110 and/or user terminal 120 may have separate transmitter and receiver components or an integrated transceiver (receiver/transmitter) units 222/254, as shown in FIG. 2.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

Nup user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all Nup user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides Nup recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for Ndn user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides Ndn downlink data symbol streams for the Ndn user terminals. A TX spatial processor 220 performs spatial processing (such as a precoding or beamforming, as described in the present disclosure) on the Ndn downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

As illustrated, in FIGS. 1 and 2, one or more user terminals 120 may send one or more High Efficiency WLAN (HEW) packets 150, with a preamble format as described herein (e.g., in accordance with one of the example formats shown in FIGS. 3A-3B), to the access point 110 as part of a UL MU-MIMO transmission, for example. Each HEW packet 150 may be transmitted on a set of one or more spatial streams (e.g., up to 4). For certain aspects, the preamble portion of the HEW packet 150 may include tone-interleaved LTFs, subband-based LTFs, or hybrid LTFs (e.g., in accordance with one of the example implementations illustrated in FIGS. 10-13, 15, and 16).

The HEW packet 150 may be generated by a packet generating unit 287 at the user terminal 120. The packet generating unit 287 may be implemented in the processing system of the user terminal 120, such as in the TX data processor 288, the controller 280, and/or the data source 286.

After UL transmission, the HEW packet 150 may be processed (e.g., decoded and interpreted) by a packet processing unit 243 at the access point 110. The packet processing unit 243 may be implemented in the process system of the access point 110, such as in the RX spatial processor 240, the RX data processor 242, or the controller 230. The packet processing unit 243 may process received packets differently, based on the packet type (e.g., with which amendment to the IEEE 802.11 standard the received packet complies). For example, the packet processing unit 243 may process a HEW packet 150 based on the IEEE 802.11 HEW standard, but may interpret a legacy packet (e.g., a packet complying with IEEE 802.11a/b/g) in a different manner, according to the standards amendment associated therewith.

Certain standards, such as the IEEE 802.11ay standard currently in the development phase, extend wireless communications according to existing standards (e.g., the 802.11ad standard) into the 60 GHz band. Example features to be included in such standards include channel aggregation and Channel-Bonding (CB). In general, channel aggregation utilizes multiple channels that are kept separate, while channel bonding treats the bandwidth of multiple channels as a single (wideband) channel.

Example Beamforming Training Procedure

In high frequency (e.g., mmWave) communication systems like 60 GHz (e.g., 802.11ad and 802.11ay), communication may be based on beamforming (BF), using directional antennas on both sides for achieving good link. Beamforming (BF) generally refers to a mechanism used by a pair of STAs to adjust transmit and/or receive antenna settings to achieve a link budget for subsequent communication.

Figure 3:
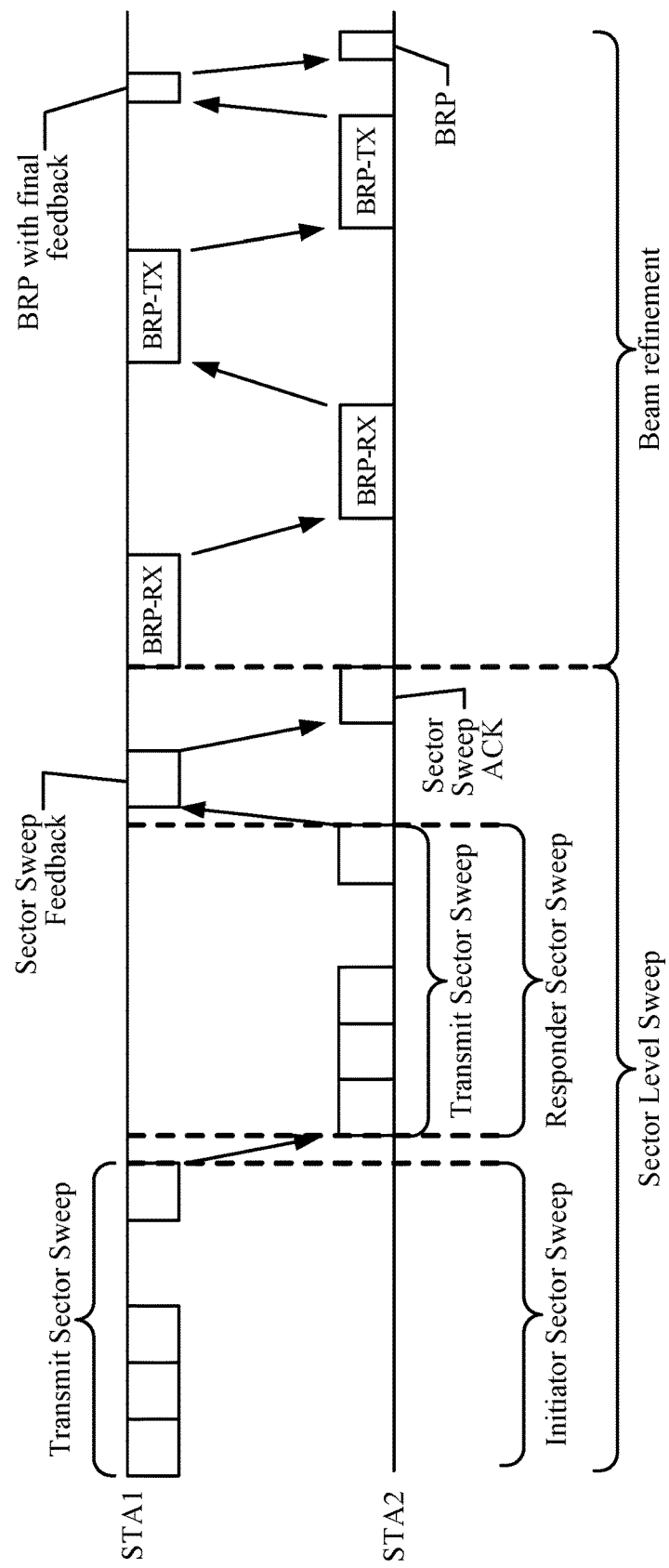
FIG. 3 illustrates an example beamforming training procedure.

As illustrated in FIG. 3, BF training typically involves a bidirectional sequence of BF training frame transmissions between stations (STA1 and STA2 in this example) that uses a sector sweep followed by a beam refining phase (BRP). During the sector sweep, each transmission may be sent using a different sector (covering a directional beam of a certain width) identified in the frame and provides the necessary signaling to allow each STA to determine appropriate antenna system settings for both transmission and reception.

As illustrated in FIG. 3, in cases where the AP has large number of elements, the sectors used are relatively narrow, causing the SLS (Sector Level Sweep) process to be long. The higher the directivity, the more sectors that may be used, and therefore the SLS may be longer. As an example, an AP with an array of 100 antenna elements may use 100 sectors. This situation may not be desired because SLS is an overhead affecting throughput, power consumption, and induces a gap in the transport flow.

Various techniques may be used to try and reduce throughput time. For example, short SSW (SSSW) messages may be used instead of the SSW messages, which may save some time (e.g., about 36%). In some cases, throughput may be reduced by utilizing the fact that in such APs the transmitter may transmit via several RF chains. This facilitates transmission in parallel on several single channels. It may shorten the scan by the factor number of frequencies (2, 3, or 4). However, this approach may involve the receiver supporting scans of the multiple frequencies, and the approach may not be backward compatible with, for example, 802.11ad devices. Further, this approach may involve the stations being fully aware of this special mode in advance. In some cases, the Tx SLS+Rx SLS or the Tx SLS+Rx BRP may be replaced with a new Tx+Rx BRP where only one "very" long BRP message may be used with many TRN units. However, this method may involve a very long message but may be able to support multiple STAs in parallel, making the approach efficient for cases with a large number of STAs.

Example Fragmented Beamforming Training

Aspects of the present disclosure provide a technique for fragmented beamforming, in which training fields are transmitted across a plurality of (beamforming refinement protocol) frames.

As noted above, performing BF training takes a significant amount of time, even if relatively fast techniques (such as BRP) are used to reduce this time. Further, there are applications that may involve low latency data traffic (such as GPU commands and sensory data) that may suffer from the latency associated with BF training.

Aspects of the present disclosure, propose a technique for fragmented BF training, such that even the relatively fast BRP BF training is divided across several frames. The techniques presented herein may be used to optimize a beam refinement phase (also sometimes referred to as a beam refinement protocol or beam refinement procedure). For example, the techniques may be used to optimizer a beam refinement phase or protocol after a connection has been established by performing SLS, which does not assume an active link.

Figure 4:
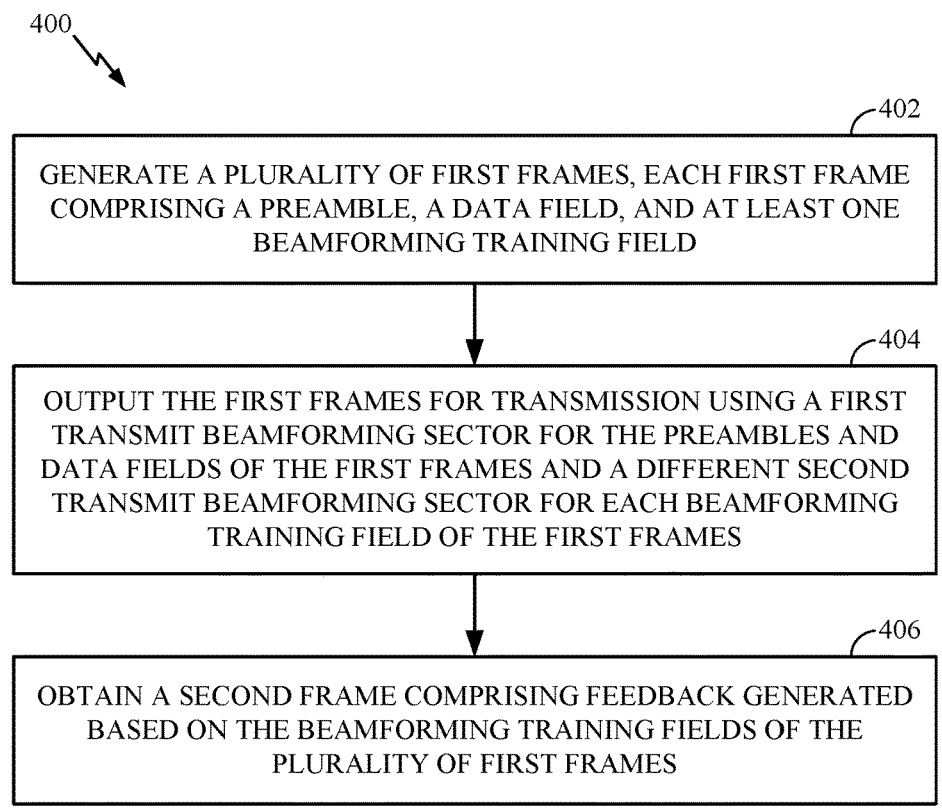
FIG. 4 illustrates example operations for beamforming training, in accordance with certain aspects of the present disclosure.

FIG. 4 illustrates example operations 400 for performing beamforming training, in accordance with certain aspects of the present disclosure. The operations 400, for example, may be performed by an AP or BS.

The operations 400 begin, at 402, by generating a plurality of first frames, each first frame comprising a preamble, a data field, and at least one beamforming training field. Operations 400 continue, at 404, by outputting the plurality of first frames for transmission using a first transmit beamforming sector for the preamble and data field of the first frames and a different second transmit beamforming sector for he beamforming training fields of the first frames. Operations 400 continue, at 406, by obtaining a second frame comprising feedback generated based on the beamforming training fields of the first frames.

Figure 5:
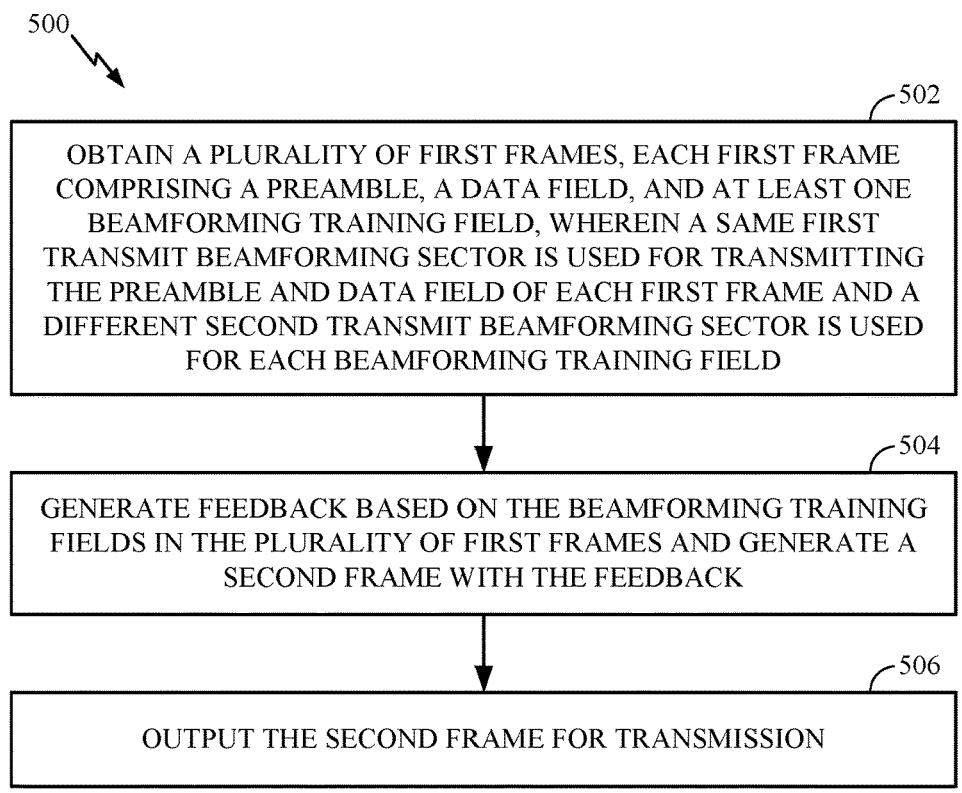
FIG. 5 illustrates example operations for beamforming training, in accordance with certain aspects of the present disclosure.

FIG. 5 illustrates example operations 500 for performing BF training, in accordance with certain aspects of the present disclosure. Operations 500 may be performed, for example, by a wireless station. The operations 500 may be considered complementary to operations 400.

Operations 500 begin, at 502, by obtaining a plurality of first frames, each first frame comprising a preamble, a data field, and at least one beamforming training field, wherein a same first transmit beamforming sector is used for transmitting the preamble and data field of each first frame and different second transmit beamforming sectors are used for the beamforming training fields of the first frames. Operations 500 continue, at 504, by generating feedback based on the beamforming training fields and generating a second frame with the feedback. Operations 500 continue, at 506, by outputting the second frame for transmission.

Figure 6:
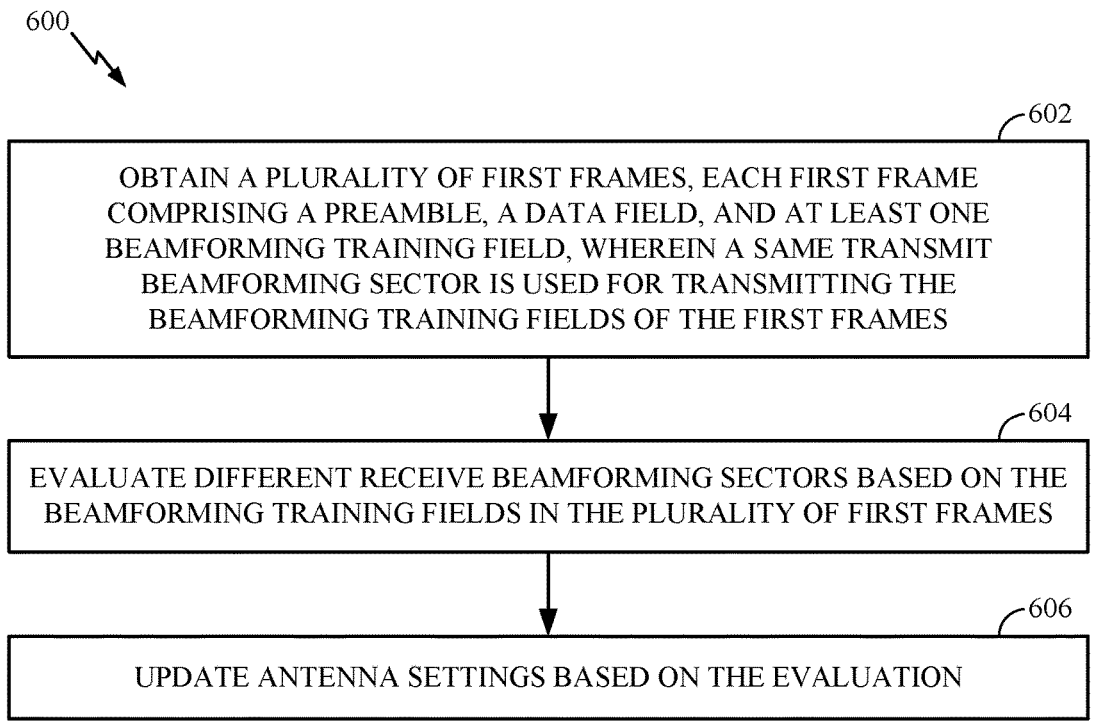
FIG. 6 illustrates example operations for beamforming training, in accordance with certain aspects of the present disclosure.

FIG. 6 illustrates example operations 600 for performing BF training, in accordance with certain aspects of the present disclosure. Operations 600 may be performed, for example, by a wireless station.

Operations 600 begin, at 602, by obtaining a plurality of first frames, each first frame comprising a preamble, a data field, and at least one beamforming training field, wherein a same transmit beamforming sector is used for transmitting the beamforming training fields of the first frames. Operations 600 continue, at 604, by evaluating different receive beamforming sectors based on the beamforming training fields in the first frames. Operations 600 continue, at 606, by updating antenna settings based on the evaluation.

Figure 7:
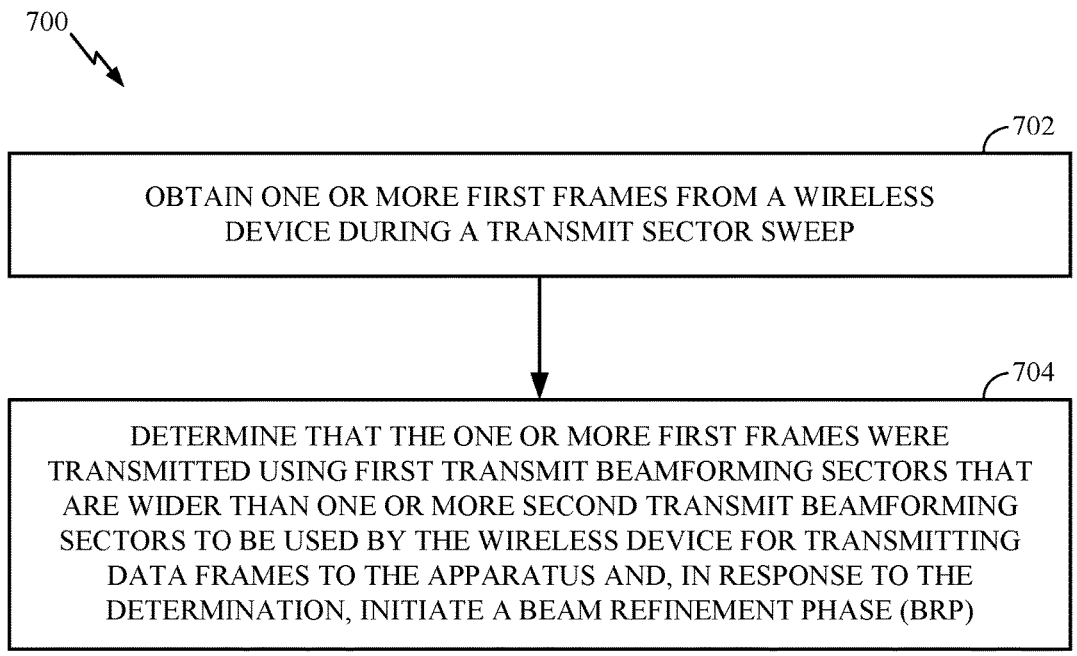
FIG. 7 illustrates example operations for beamforming training, in accordance with certain aspects of the present disclosure.

FIG. 7 illustrates example operations 700 for performing beamforming training, in accordance with certain aspects of the present disclosure. The operations 700, for example, may be performed by an AP or BS.

The operations 700 begin, at 702, by generating a plurality of first frames, each first frame comprising a preamble, a data field, and at least one beamforming training field. Operations 700 continue, at 704, by outputting the plurality of first frames for transmission using a same transmit beamforming sector for each of the beamforming training fields.

In some cases, fragmented transmit beamforming may involve sending a single TRN unit at each frame. In this case, collecting BF of 64 sectors may be obtained after 64 frames. However, with data sent in each BRP frame, the data may not suffer a relative latency impact.

As noted above, fragmented BRP frames may be output for transmission during a fragmented transmit beam refinement protocol. While the preamble and data portions of each BRP frame may be sent using the same transmit beamforming sector (e.g., as selected after SLS), a different transmit beamforming sector may be used for each training field.

In some cases, the feedback generated over multiple fragmented frames may indicate a preferred transmit beamforming sector. The feedback may be generated by a responder. In one or more cases, the feedback that indicates the preferred transmit beamforming sector that may be used for subsequent transmissions. In some cases, an indication of at least one of a number of training fields to be included in one or more frames may be provided. An interface may be further configured to output the indication for transmission.

In one or more cases, a transmitting device may select a number of training fields to be included in each BRP frame (e.g., based on an amount of data queued, latency limits, and/or latency requirements) and this number (as well as the number of BRP frames in a fragmented training procedure) may be signaled to the receiving device. In some cases, each BRP frame may include only a single beamforming training field (e.g., if the amount of data to be transmitted is equal to or greater than a threshold value).

Figure 4A:
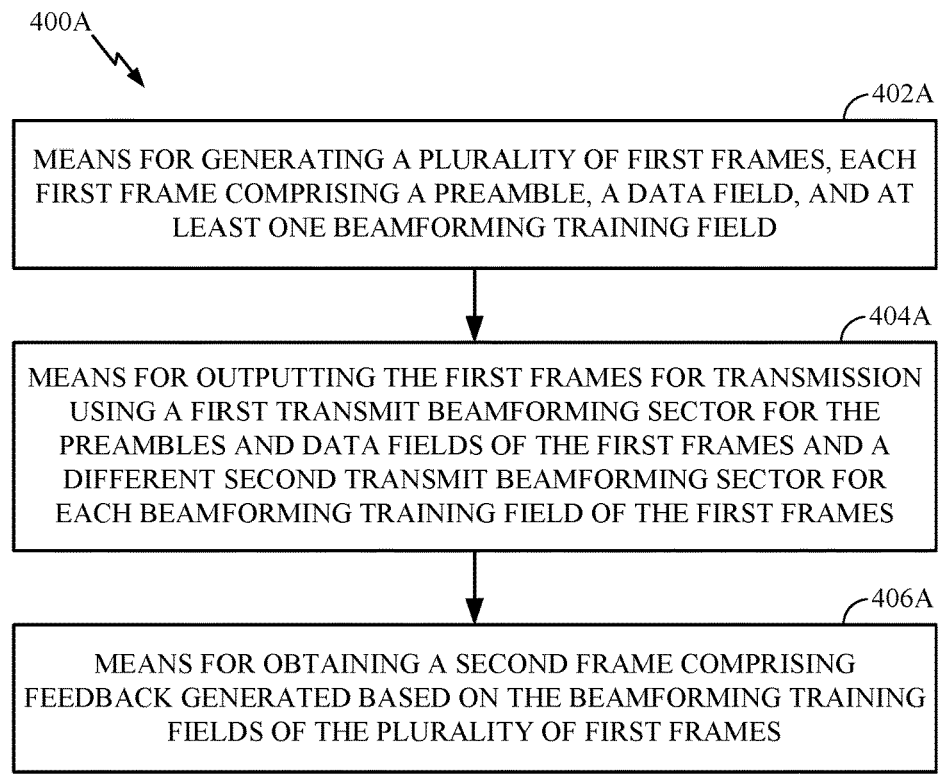
FIG. 4A illustrates example components capable of performing the operations shown in FIG. 4.
Figure 5A:
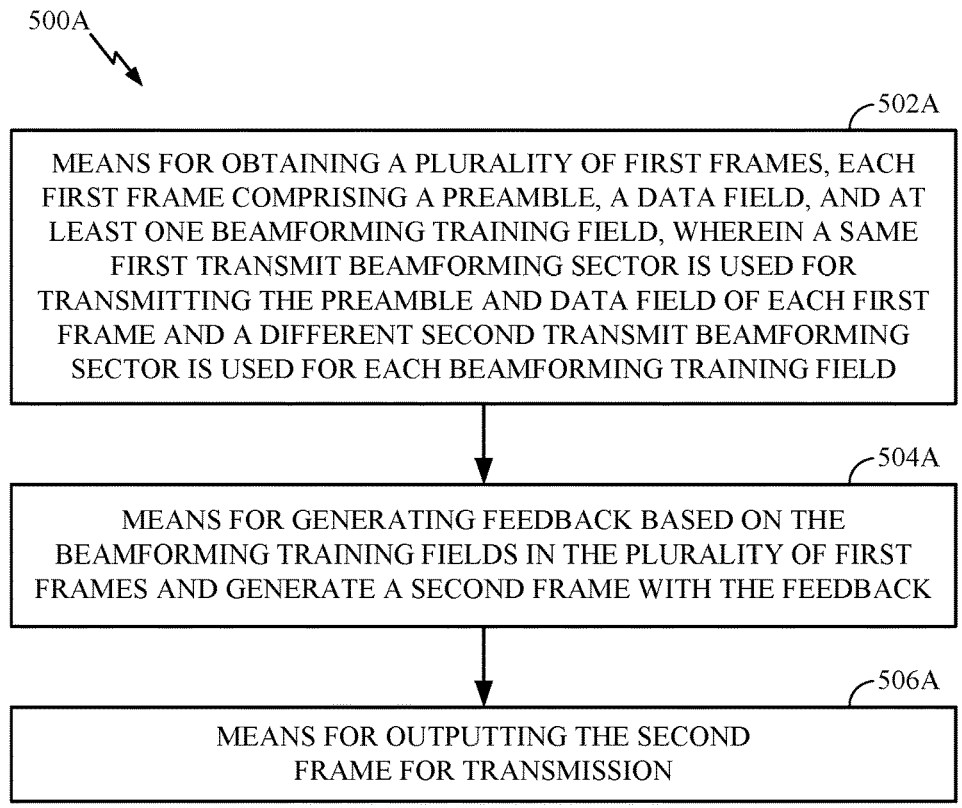
FIG. 5A illustrates example components capable of performing the operations shown in FIG. 5.
Figure 6A:
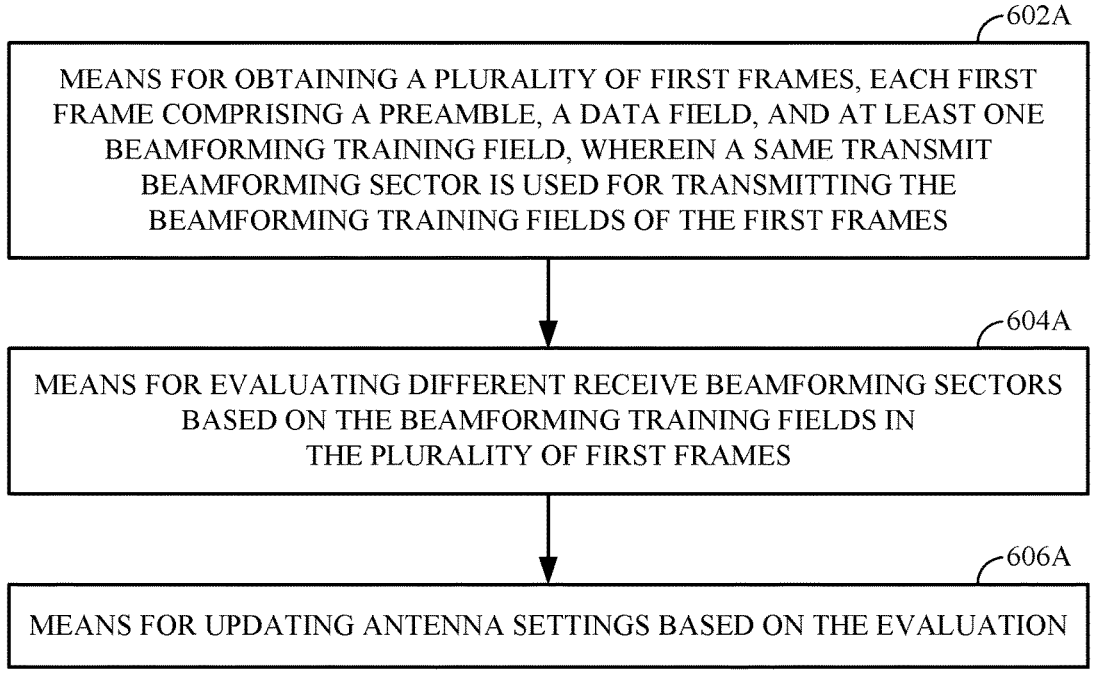
FIG. 6A illustrates example components capable of performing the operations shown in FIG. 6.
Figure 7A:
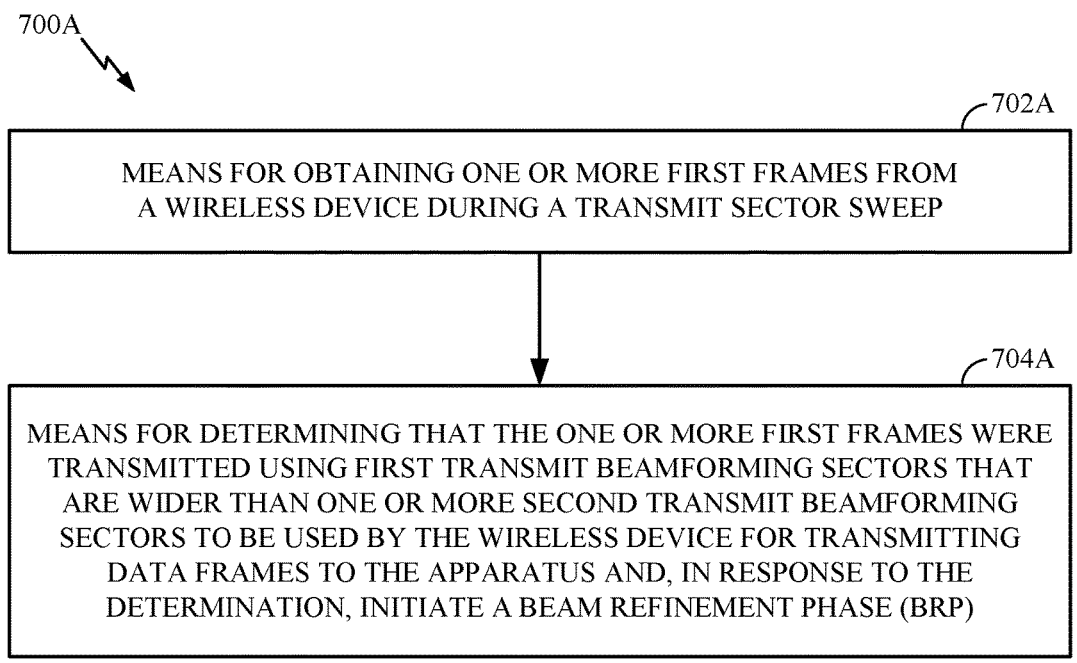
FIG. 7A illustrates example components capable of performing the operations shown in FIG. 7.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 400 illustrated in FIG. 4 correspond to means 400A illustrated in FIG. 4A, operations 500 illustrated in FIG. 5 correspond to means 500A illustrated in FIG. 5A, operations 600 illustrated in FIG. 6 correspond to means 600A illustrated in FIG. 6A, operations 700 illustrated in FIG. 7 correspond to means 700A illustrated in FIG. 7A.

For example, means for transmitting (or means for outputting for transmission) may comprise a transmitter (e.g., the transmitter unit 222) and/or an antenna(s) 224 of the access point 110 or the transmitter unit 254 and/or antenna(s) 252 of the user terminal 120 illustrated in FIG. 2. Means for receiving (or means for obtaining) may comprise a receiver (e.g., the receiver unit 222) and/or an antenna(s) 224 of the access point 110 or the receiver unit 254 and/or antenna(s) 254 of the user terminal 120 illustrated in FIG. 2. Means for processing, means for obtaining, means for generating, means for selecting, means for determining, means for including, means for using, means for updating, or means for evaluating may comprise a processing system, which may include one or more processors, such as the RX data processor 242, the TX data processor 210, the TX spatial processor 220, and/or the controller 230 of the access point 110 or the RX data processor 270, the TX data processor 288, the TX spatial processor 290, and/or the controller 280 of the user terminal 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception. In some cases, an interface to output a frame for transmission and an interface for obtaining a frame may be integrated as a single interface.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods described herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
    a processing system configured to generate a plurality of first frames, each first frame comprising a preamble, a data field, and at least one beamforming training field;
    a first interface configured to output the first frames for transmission using a first transmit beamforming sector for the preambles and data fields of the first frames and different second transmit beamforming sectors for the beamforming training fields of the first frames; and
    a second interface configured to obtain a second frame comprising feedback generated based on the beamforming training fields of the plurality of first frames.

2. The apparatus of claim 1, wherein the first frames are output for transmission during a fragmented transmit beam refinement protocol.

3. The apparatus of claim 1, wherein each of the second transmit beamforming sectors is different than the first transmit beamforming sector.

4. The apparatus of claim 1, wherein:
the feedback indicates one of the second transmit beamforming sectors; and
the processing system is configured to use the indicated second transmit beamforming sector for subsequent transmissions.

5. The apparatus of claim 1, wherein:
the processing system is further configured to generate an indication of at least one of a number of training fields to be included in each first frame or a number of the plurality of first frames; and
the first interface is further configured to output the indication for transmission.

6. The apparatus of claim 1, wherein the processing system is configured to determine how many beamforming training fields to include in each first frame based, at least in part, on an amount of data to be transmitted and to include the determined number of beamforming training fields in each first frame.

7. The apparatus of claim 6, wherein the processing system is configured to include a single beamforming training field in each first frame if the amount of data to be transmitted is equal to or greater than a threshold value.

8. The apparatus of claim 1, wherein the processing system is configured to determine how many beamforming training fields to include in each first frame based, at least in part, on latency limits for data traffic between the apparatus and a wireless device and to include the determined number of beamforming training fields in each first frame.

9. The apparatus of claim 1, further comprising at least one antenna via which the first frames are output for transmission and the second frame is obtained, wherein the apparatus is configured as a wireless station.

10. An apparatus for wireless communications, comprising:
a first interface configured to obtain a plurality of first frames, each first frame comprising a preamble, a data field, and at least one beamforming training field, wherein a same first transmit beamforming sector is used for transmitting the preamble and data field of each first frame and different second transmit beamforming sectors are used for the beamforming training fields of the first frames;
a processing system configured to generate feedback based on the beamforming training fields in the plurality of first frames and generate a second frame with the feedback; and
a second interface configured to output the second frame for transmission.

11. The apparatus of claim 10, wherein the first frames are obtained during a fragmented transmit beam refinement protocol.

12. The apparatus of claim 10, wherein each of the second transmit beamforming sectors is different than the first transmit beamforming sector.

13. The apparatus of claim 10, wherein:
the processing system is configured to select one of the second transmit beamforming sectors based on the beamforming training fields in the plurality of first frames; and
the feedback comprises an indication of the selected second transmit beamforming sector.

14. The apparatus of claim 10, wherein:
the first interface is further configured to obtain an indication of at least one of a number of training fields to be included in each first frame or a number of the plurality of first frames; and
the processing system is configured to process the plurality of first frames based on the indication.

15. The apparatus of claim 10, further comprising at least one antenna via which the first frames are obtained and the second frame is output for transmission, wherein the apparatus is configured as a wireless station.

16. An apparatus for wireless communications, comprising:
a first interface configured to:
obtain a plurality of first frames, each first frame comprising a preamble, a data field, and at least one beamforming training field, wherein a same transmit beamforming sector is used for transmitting the beamforming training fields of the first frames; and
obtain a second frame having an indication of at least one of a number of training fields to be included in each first frame or a number of the plurality of first frames; and
a processing system configured to:
evaluate different receive beamforming sectors based on the beamforming training fields in the plurality of first frames and the indication in the second frame, and
update antenna settings based on the evaluation.

17. The apparatus of claim 16, wherein the first frames are obtained during a fragmented receive beam refinement protocol.

18. The apparatus of claim 16, further comprising at least one antenna via which the first frames are obtained, wherein the apparatus is configured as a wireless station.

19. An apparatus for wireless communications, comprising:
a processing system configured to:
generate a plurality of first frames, each first frame comprising a preamble, a data field, and at least one beamforming training field; and
determine how many beamforming training fields to include in each first frame based at least in part, on an amount of data to be transmitted and to include the determined number of beamforming training fields in each first frame; and
a first interface configured to output the first frames for transmission using a same transmit beamforming sector for each beamforming training field.

20. The apparatus of claim 19, wherein the first frames are output for transmission during a fragmented transmit beam refinement protocol.

21. The apparatus of claim 19, wherein:
the processing system is further configured to generate an indication of at least one of the number of beamforming training fields to be included in each first frame or a number of the plurality of first frames; and
the first interface is further configured to output the indication for transmission.

22. The apparatus of claim 19, wherein the processing system is configured to include a single beamforming training field in each first frame if the amount of data to be transmitted is equal to or greater than a threshold value.

23. The apparatus of claim 19, wherein the processing system is further configured to determine how many beamforming training fields to include in each first frame based, at least in part, on latency limits for data traffic between the apparatus and a wireless device.

24. The apparatus of claim 19, further comprising at least one antenna via which the first frames are output for transmission, wherein the apparatus is configured as a wireless station.

* * * * *